2,012,708

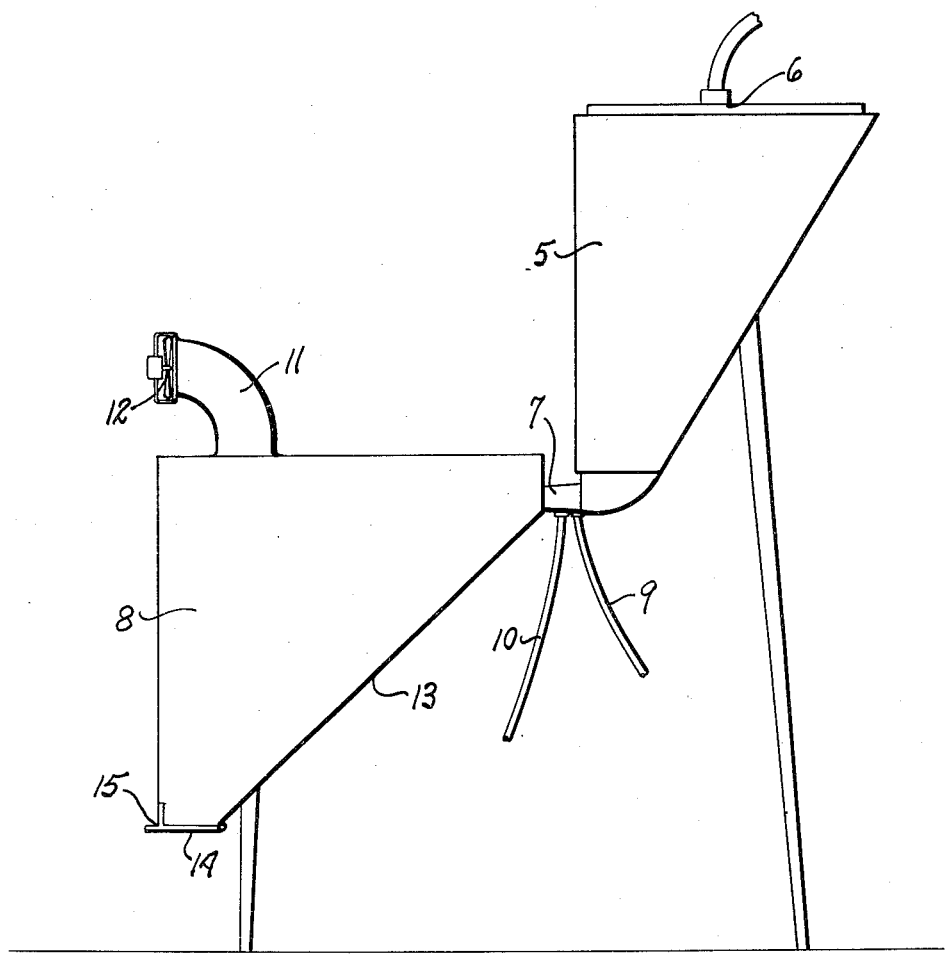
Inventors
Elizabeth J. Bostrom
Austin P. Summers
By Glenn L. Fish
Attorney Patented Aug. 27, 1935

UNITED STATES PATENT OFFICE 2,012,708

PROCESS FOR COLORING FLOUR

Elizabeth J. Bostrom and Austin P. Summers, Spokane, Wash.

Application May 27, 1933, Serial No. 673,219

1 Claim. (Cl. 99—10)

Our invention relates to processes for coloring flour and more particularly to the method of coloring wheat or other kinds of flour with liquid dyes. The primary objects of the invention are to provide a method for quickly and efficiently coloring flour for use in making fancy pastries, bread, cake and the like.

Essentially the process consists of feeding flour, under pressure, from a hopper through a restricted nozzle or other passage into a receptacle and in feeding coloring matter, which is preferably a liquid vegetable dye, through a separate pipe into the nozzle where it is contacted and taken up by the flour, and in also projecting a jet of compressed air into the nozzle by a separate pipe at a point slightly in advance of the point of entry of the dye whereby a suction is created in the nozzle which draws the flour and dye through the nozzle thoroughly mixing same together and projecting the mixture into the receptacle.

The figure in the drawing shows a somewhat diagrammatic view of an apparatus which may be used in carrying out the process, it being understood that the method is not limited to the particular form of apparatus shown. Referring in detail to the drawing, the numeral 5 designates a hopper or other container for the flour and pressure may be applied to the flour at the top of the hopper by means of compressed air or by mechanical means as shown at 6. At the lower contracted end of the hopper a nozzle or other restricted passage 7 conducts the flour into a receptacle 8. It will be understood that a steady supply of flour may be fed into the top of the hopper and a continuous pressure applied so as to cause a continuous flow of flour through the nozzle.

Coloring matter, such as liquid vegetable dye, is introduced into the nozzle 7 through a pipe 9. Compressed air is projected into said nozzle by means of a pipe 10 which taps the nozzle at a point slightly in advance or forward of the point where the dye enters said nozzle. In the action of the device the jet of air creates a suction within the nozzle thus drawing the flour through and the flour takes up an even amount of dye which is thoroughly mixed into the flour by the action of the air jet. At the same time the jet of air blows the mixture forward into the receptacle 8.

The receptacle 8 may have an outlet as shown at 11 and a turbine or fan 12 may be installed in the mouth of said outlet for the purpose of drawing off and removing excessive moisture from the flour which may be caused by the dye. From the nozzle 7 a wall 13 slants downwardly and forwardly to a contracted bottom 14. An opening 15 is provided at said bottom through which the dry colored flour is removed and packed ready for use.

It will now be apparent that we have provided an art and means for thoroughly mixing coloring matter with flour. The work is quickly done, it being obvious that the process is continuous in mixing the coloring matter with the stream of flour passing through the nozzle or restricted passage and a continuous supply of the finished product is supplied at the opening 15. The colored flour is used in making fancy pastries, bread, cakes and the like.

Having thus described our invention what we claim and desire to secure by Letters Patent of the United States is:—

The method of coloring flour consisting of continuously feeding flour under air pressure through a gradually restricted passage into a settling chamber, spraying liquid coloring matter under pressure into the restricted passage to color the flour as the flour passes through the passage, delivering compressed air into the restricted passage upon the colored flour to dry the coloring matter while the flour is in suspension and advance the colored flour into the settling chamber, and withdrawing moist air from the settling chamber.

ELIZABETH J. BOSTROM.
AUSTIN P. SUMMERS.